(12) United States Patent
Koschinski et al.

(10) Patent No.: US 11,104,440 B2
(45) Date of Patent: Aug. 31, 2021

(54) GAP COVERING BETWEEN CABIN MONUMENTS, IN PARTICULAR FOR A PASSENGER CABIN OF AN AIRCRAFT

(71) Applicant: AIRBUS OPERATIONS GMBH, Hamburg (DE)

(72) Inventors: Norman Koschinski, Hamburg (DE); Christian Jacobsen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 420 days.

(21) Appl. No.: 16/170,521

(22) Filed: Oct. 25, 2018

(65) Prior Publication Data

US 2019/0127069 A1 May 2, 2019

(30) Foreign Application Priority Data

Oct. 27, 2017 (DE) ............... 10 2017 125 299.1

(51) Int. Cl.
*B64D 11/04* (2006.01)
*F16B 5/02* (2006.01)
*F16B 5/06* (2006.01)

(52) U.S. Cl.
CPC ............ *B64D 11/04* (2013.01); *F16B 5/02* (2013.01); *F16B 5/0692* (2013.01)

(58) Field of Classification Search
CPC ............ B64D 11/04; B64D 2011/0046; F16B 5/0692; F16B 5/02
USPC .................................................. 244/118.5
See application file for complete search history.

(56) References Cited

U.S. PATENT DOCUMENTS

| 3,363,383 | A |   | 1/1968 | La Barge |
|---|---|---|---|---|
| 4,111,584 | A | * | 9/1978 | Fyfe ............... E01D 19/06 404/69 |
| 4,290,249 | A | * | 9/1981 | Mass .............. E01D 19/06 404/65 |

(Continued)

FOREIGN PATENT DOCUMENTS

| DE | 10 2004 049 893 A1 | 4/2006 |
|---|---|---|
| DE | 10 2006 017 241 A1 | 10/2007 |
| DE | 10 2011 120 762 A1 | 6/2013 |

OTHER PUBLICATIONS

German Search Report for German Application No. 10 2017 125 299.1 dated Aug. 2, 2018.

*Primary Examiner* — Claude J Brown
(74) *Attorney, Agent, or Firm* — Jenkins, Wilson, Taylor & Hunt, P.A.

(57) ABSTRACT

A cabin monument arrangement for a passenger cabin of an aircraft, has at least two cabin monuments arranged next to each other, aligned substantially parallel and forming a gap. The gap includes a gap covering in the fastening region of the first lateral monument part and of the second lateral monument part in the region of the front edge portion of the respective cabin monument. In each case, a first contour-adapted rigid fastening strip is on the fastening region and a second contour-adapted, rigid fastening strip is on the second fastening region. A covering element is between the first and second fastening strips for covering the gap between the first monument part and the second monument part, the covering element formed from a flexible covering material of thin design. A corresponding covering of the gap between the cabin monuments can therefore be achieved with sufficient flexibility and material width.

12 Claims, 7 Drawing Sheets

(56) References Cited

U.S. PATENT DOCUMENTS

| | | | |
|---|---|---|---|
| 5,365,713 | A | 11/1994 | Nicholas et al. |
| 5,875,598 | A * | 3/1999 | Batten .................... E01D 19/06 52/396.01 |
| 7,658,044 | B2 | 2/2010 | Roth |
| 8,882,045 | B2 | 11/2014 | Roth |
| 2012/0280083 | A1 | 11/2012 | Dazet |

* cited by examiner

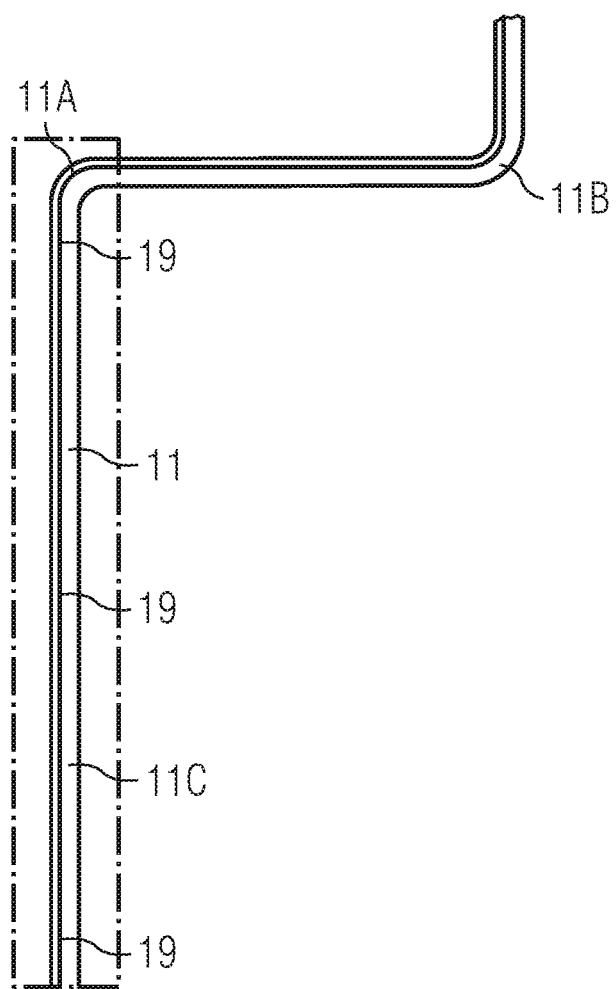

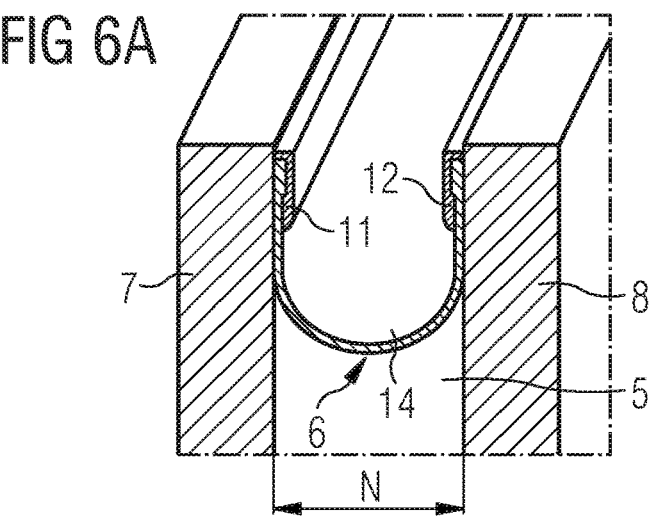
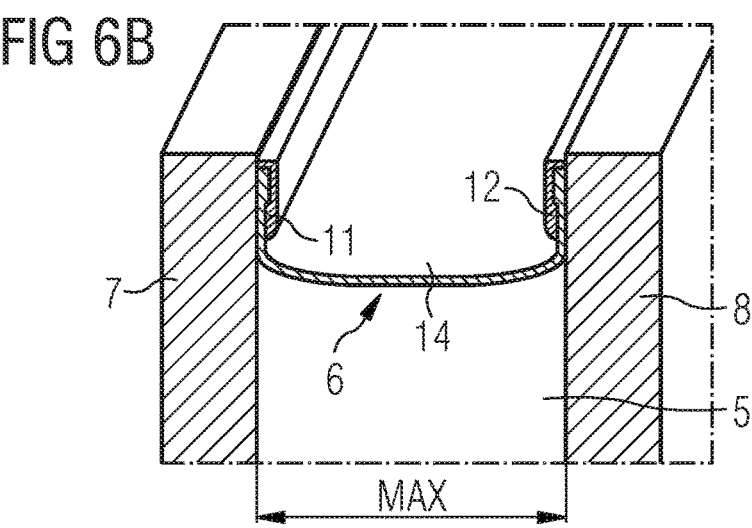
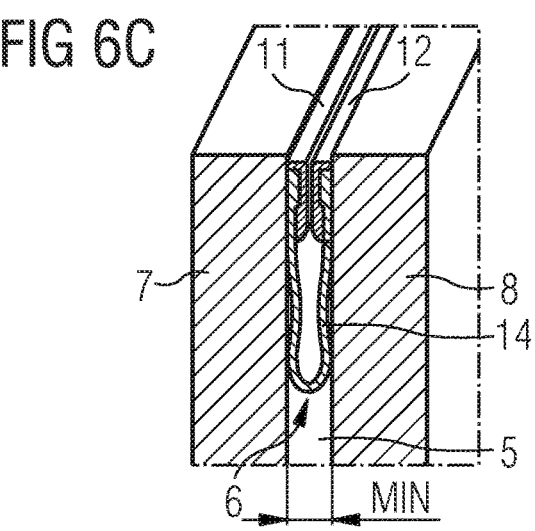

GAP COVERING BETWEEN CABIN MONUMENTS, IN PARTICULAR FOR A PASSENGER CABIN OF AN AIRCRAFT

CROSS-REFERENCE TO RELATED APPLICATION

This application claims priority to German Patent Application DE 10 2017 125 299.1 filed Oct. 27, 2017, the entire disclosure of which is incorporated by reference herein.

TECHNICAL FIELD

The disclosure herein relates to a gap covering between cabin monuments, in particular for a passenger cabin of an aircraft, and to a method for installing cabin monuments with a gap covering in an aircraft.

BACKGROUND

In aircraft, interior furnishings, for example ceiling or wall claddings, are fastened to the primary structure of the aircraft or to other supporting aircraft elements by fastening elements. In order to obtain a harmonious appearance between the cladding parts, gap coverings are necessary. Gap coverings are also customary between cabin monuments. During flight, the aircraft fuselage with the components arranged therein is exposed to considerable loadings, and deformations of the fuselage and therefore displacements of the interior furnishing parts with respect to one another occur. It is therefore necessary to achieve a certain flexible covering by gap coverings between interior furnishing components. A further requirement for the installation of interior furnishing parts within the aircraft fuselage is to compensate for installation tolerances between the interior furnishing parts, for example between cabin monuments, by adapted coverings.

For example, DE 102004049893 A1 discloses a gap covering between interior furnishing parts of an aircraft. The gap covering is held in position by a clamping portion, which is arranged between two cabin panels positioned next to each other. In one embodiment, it is provided that a partial region of the clamping portion is fastened to the first or to the second cladding panel. A covering portion is positioned in such a manner that it is placed against the front sides of the cabin panels.

DE 102006017241 A1 discloses a flat gap covering for aircraft cabin claddings. The gap covering is fastened here to the respective rear sides of the two cladding parts positioned next to each other. The gap covering is provided from elastic material which leads to sagging or to stretching when two adjacent wall elements are displaced.

SUMMARY

It is an object of the disclosure herein to provide a gap covering between cabin monuments in an aircraft, which permits simple and secure covering of the gap present between cabin monuments. Furthermore, an installation-friendly design of the gap covering is disclosed.

The object is achieved by the subject matter disclosed herein.

According to an exemplary embodiment of the disclosure herein, a gap covering for a cabin monument arrangement, in particular for a passenger cabin of an aircraft, is specified. The cabin monument arrangement comprising at least two cabin monuments, which are arranged next to each other and the lateral monument parts of which are oriented substantially parallel, forms a gap which is provided with a gap covering. The gap covering has the following features:

a respective fastening region runs along the first lateral monument part (7) and along the second lateral monument part (8) in the region of the front edge portion (9, 10) of the respective cabin monument (3, 4), a first contour-adapted rigid fastening strip is provided on the first fastening region and a second contour-adapted rigid fastening strip is provided on the second fastening region, a covering element is arranged between the first and second fastening strips for covering the gap between the first monument part and the second monument part, wherein the covering element is formed from a flexible covering material of thin design.

A movement of the first cabin monument relative to the second cabin monument leads to a compensating movement of the covering material of the covering region, which is suitable for achieving a corresponding complete covering of the gap by sufficient flexibility and material width.

With the use of the first and second contour-adapted rigid fastening strips for connecting the gap covering to the fastening regions of the monument parts, simple installability is achieved. Complicated adjustment operations can be avoided. Good accessibility for the installation is provided by the fastening to the respective front edge portion of the lateral monument part.

The gap covering according to the disclosure herein is also securely positioned for the possible movements of the cabin monuments during a flight. No slipping of the covering elements out of the gap, which could lead to additional operations or to the replacement of the gap covering, is possible.

The formation of the cabin monument arrangement with fastening strips which can be arranged on the respective lateral monument part at at least two fastening points likewise serves for rapid and secure installation of the gap covering according to the disclosure herein.

The fastening strip can advantageously have curved regions and rectilinear regions, which are adapted to the monument contour. The vertical and horizontal surfaces can thus be followed even in the case of monuments which are in the form of a galley.

The fastening strip can be formed as a single part or as multiple parts. The multi-part fastening strip can be joinable together with curved and rectilinear strip portions and can therefore be adapted to the border contour of the respective monument. For the production of the fastening strip from a plurality of parts, plugging together, adhesive bonding, screwing, a combination of the methods or other joining methods familiar to a person skilled in the art are possible.

The gap covering can advantageously have covering material from strips of fabric, textile material, film or rubber or from a combination of the materials. With the selection of the correct covering material for the gap covering, simple and easy cleaning is also achievable at the same time in order to rapidly and hygienically remove possible impurities occurring in particular in the galley region.

In a preferred refinement, the covering material of the gap covering is of U-shaped or foldable design and is connected at the two border regions to the fastening strips. A lightweight design is therefore achieved and is further optimized by the selection of the material of the fastening strip from aluminum, plastic, glass-fiber-reinforced plastics fiber material or carbon-fiber-reinforced plastics fiber material.

The fastening strip is advantageously provided with rapid installation fastening elements in the region of the fastening points. For example, press-stud fastenings, fastening pins, clip fastenings or other rapid fasteners customary for a person skilled in the art are possible.

According to a further exemplary embodiment of the disclosure herein, a method for installing a first cabin monument and a second cabin monument in an aircraft passenger cabin with a gap covering located in between is specified. The method comprises steps of:
a. aligning and securing a first cabin monument;
b. attaching the gap covering with a first fastening strip in the front edge region of the first cabin monument;
c. aligning and securing a second cabin monument in such a manner that the respective lateral monument parts are aligned substantially parallel and form a gap;
d. attaching a second fastening strip in the front edge region of the second cabin monument;
e. directing the covering material of the gap covering into a uniform alignment.

In an advantageous refinement, the method steps b and c can also be interchanged.

An aircraft passenger cabin comprising an advantageous cabin monument arrangement according to the disclosure herein is likewise specified.

BRIEF DESCRIPTION OF THE DRAWINGS

Preferred exemplary embodiments of the disclosure herein present disclosure are described below with reference to the example figures. The same reference signs are used for the same or similar elements.

The illustrations in the figures are schematic and are not to scale.

FIG. 2 illustrates, in an aircraft cabin layout, two cabin monuments which are arranged next to each other with a gap covering positioned in between.

FIG. 5 illustrates, in a side view, a fastening strip according to the disclosure herein.

FIGS. 6A, 6B and 6C illustrate, in a detailed view, two side parts having different gap widths with a gap covering according to the disclosure herein located in between, with the first embodiment of the covering material.

DETAILED DESCRIPTION

Figure 1A:
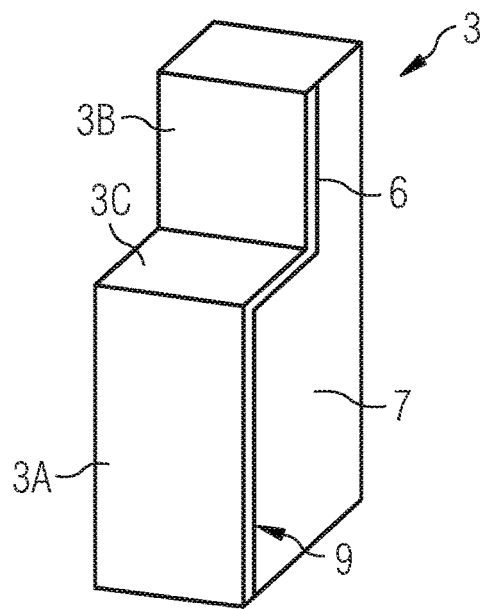
FIG. 1A is a schematic illustration of a cabin monument with a gap covering according to the disclosure herein.

FIG. 1A illustrates a schematic illustration of a cabin monument 3 with a gap covering 6 according to the disclosure herein in a perspective illustration. As can also be seen, inter alia, in the side view in FIG. 1B, the cabin monument 3 is in the form of a galley. For this purpose, the lower part 3A of the cabin monument 3 is provided with a stowage space for catering vessels, known as "trolleys" (not shown). The upper part 3B of the cabin monument 3 is provided with a smaller depth and therefore produces a horizontally running surface 3C between the parts 3A and 3B, which surface can be used as a worktop of the galley. If a second cabin monument 4 is now positioned next to the first cabin monument 3, a gap 5 is produced (see the figures). A gap covering 6 according to the disclosure herein is arranged on the cabin monument 3 in the front edge region 9 on the lateral monument part 7.

Figure 1B:
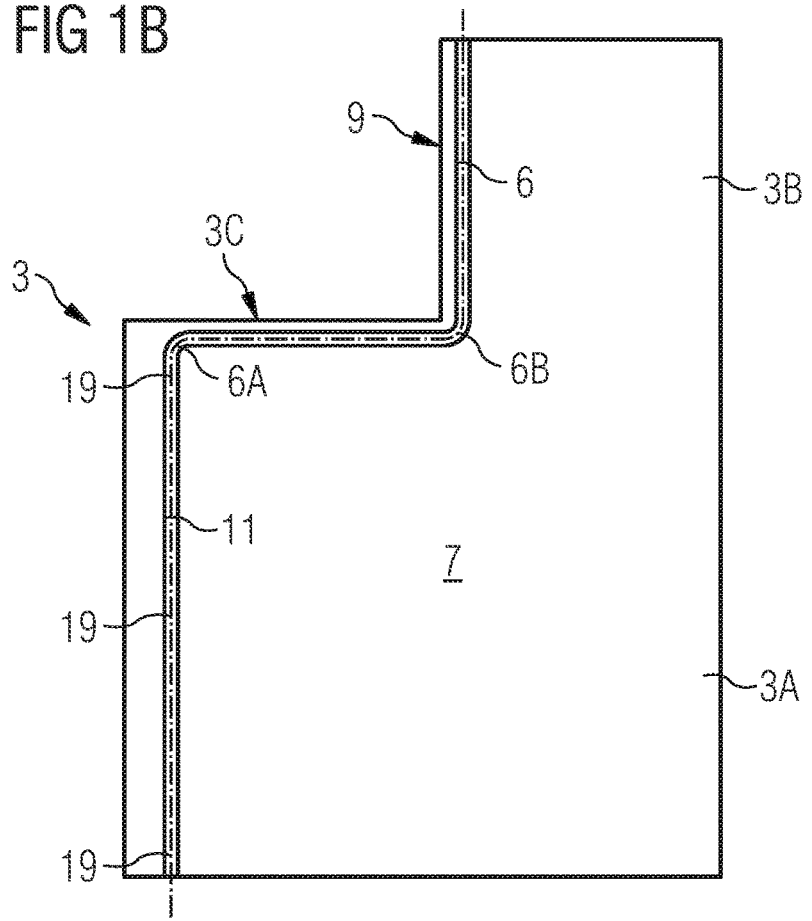
FIG. 1B is a side view of the cabin monument illustrated in FIG. 1A.

It can readily be seen in particular in FIG. 1B that, on account of the shape of the cabin monument 3, the gap covering 6 has curved regions 6A and 6B in order to follow the corresponding contour of the galley. The regions are a particular challenge for a visually satisfactory gap covering and can advantageously be solved with the gap covering 6 according to the disclosure herein that is described here. The gap covering 6 has, per lateral monument part 7, 8 (also see FIG. 3 et seq.), a contour-adapted rigid fastening strip 11, 12 which securely positions the flexible covering material 14 in the gap 5. The fastening strip 11 is connected to the respective lateral monument part 7, 8 at a plurality of fastening points 19. It has been shown that the rigid fastening strip 11 can also contain elements 11A and 11B formed in a curved manner in accordance with the side contour of the cabin monument 3. Further details of the embodiments according to the disclosure herein of the gap covering 6 are described in FIG. 3 et seq. below.

Figure 2:
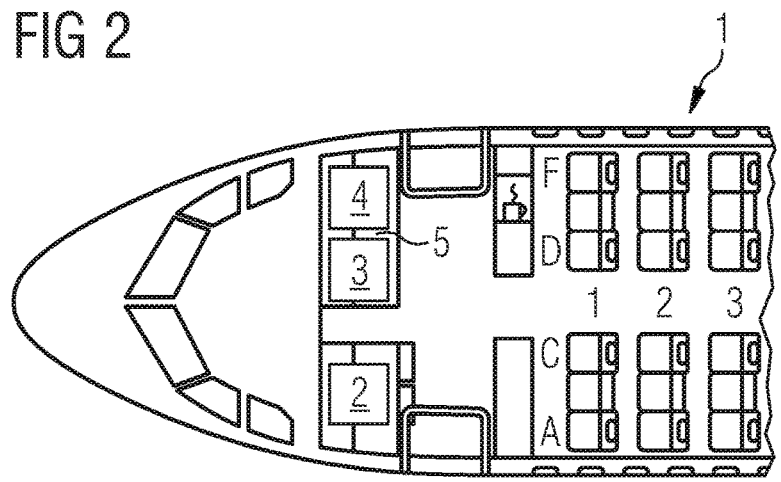

FIG. 2 illustrates the cabin layout of an aircraft passenger cabin 1. Cabin monuments 2, 3, 4 are arranged by way of example in the entry region of the aircraft. An on-board toilet is shown under reference sign 2. Furthermore, a galley arrangement consisting at least of two galleys (cabin monuments) 3 and 4 positioned next to each other is illustrated. A gap covering 6 according to the disclosure herein is fastened in the gap 5 located in between. An important feature of the gap covering is the positioning in the front edge portion 9, with it being avoided, however, that parts of the gap covering 6 project into the working space in front of the galley.

Figure 3:
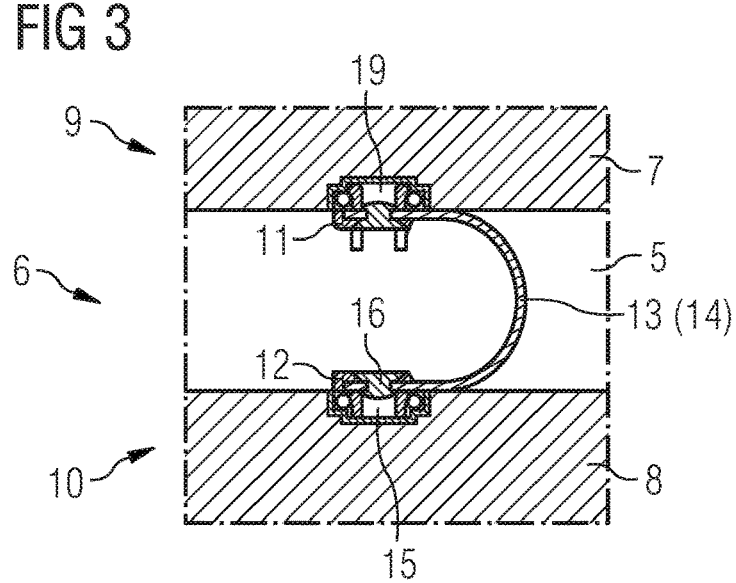
FIG. 3 illustrates, in a detailed illustration in the form of a sectional illustration, two side parts which are positioned next to each other with a gap covering located in between, with a first embodiment of the covering material.

FIG. 3 illustrates the section A-A (see FIG. 1B) in a detailed illustration. A first lateral monument part 7 and a second lateral monument part 8 are positioned substantially parallel to each other and form a gap 5. In the region of the respective front edge portion 9 and 10 of the side walls 7 and 8, the gap covering 6 is arranged in the gap 5. The rigid fastening strips 11 and 12 are introduced and secured at fastening points 19 by a fastening button 16, preferably a press-stud, in fastening button receptacles 15. The fastening button receptacles 15 are each provided on the lateral monument walls 7 and 8 during the process of manufacturing the cabin monument. This means that, after the galley with at least two monuments 3 and 4 is fitted in the aircraft passenger cabin, the gap covering 6 with the fastening strips 11 and 12 can be positioned on the respective lateral monument walls and rapid installation can take place by press studs. A visually attractive covering region 13 of the gap 5 between the first and second fastening strips 11 and 12 is therefore provided. The covering region 13 is preferably formed from a flexible covering material 14 of thin design. For example, use can be made of textile materials, films and elastic materials, such as rubber strips, which have an excess length in width of up to twice a normally provided gap width. In a first embodiment of the covering material 14, a U-shape arching of the material used is possible.

The fastening strip 11, 12 can be formed from a flat aluminum strip or a flat plastic strip. In a preferred embodiment, it is provided that an adhesive connection secures the flexible covering material 14 to the respective fastening strip 11, 12. In combination or alternatively, connecting pins, press-studs or other securing devices can also be provided.

Figure 8A:
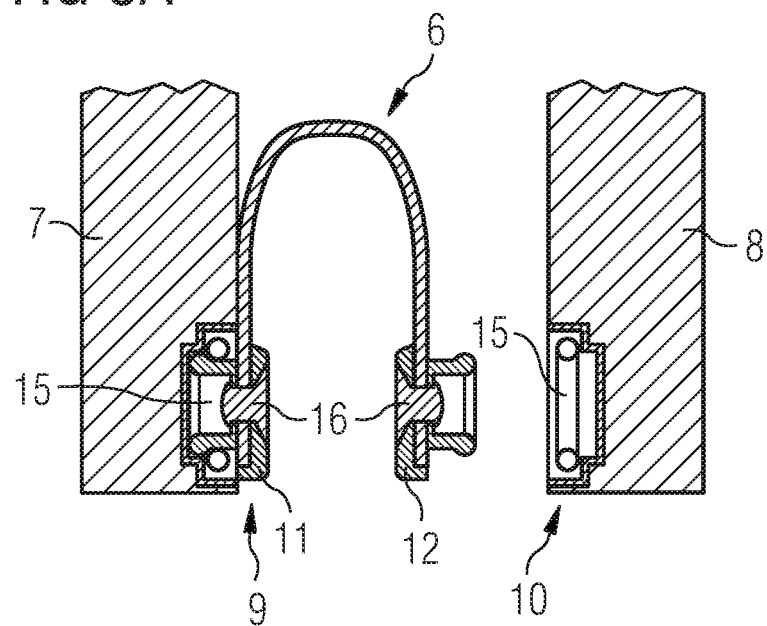
FIGS. 8A and 8B illustrate, in a detailed view, the fastening of the gap covering according to the disclosure herein by a fastening button.
Figure 8B:
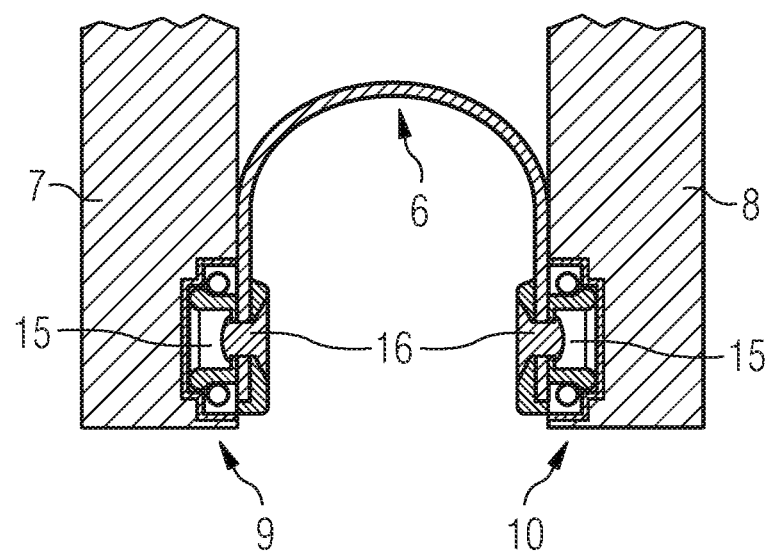

The sectional profile A-A (see FIG. 1B) is shown in the sectional plane of a fastening point 19. The fastening strips 11 and 12 of the gap covering 6 are secured on the lateral monument parts 7 and 8 by the press-stud connection described. Further details of the press-stud connection are shown in FIGS. 8A and 8B. Any other forms of rapid installation connections, for example pin or clip or screw connections, are likewise conceivable. A further advantageous form of the fastening is explained in more detail, for example in FIG. 4.

Figure 4:
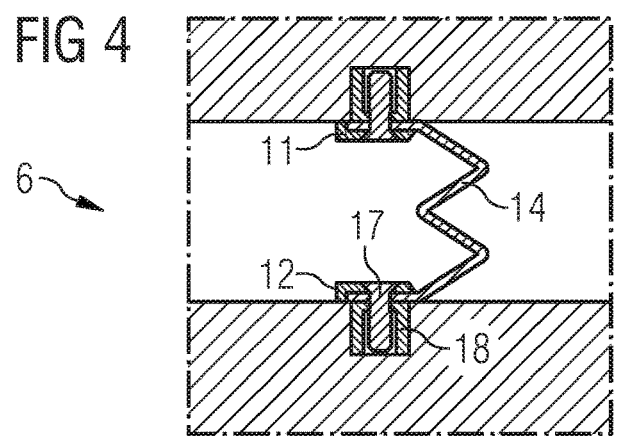
FIG. 4 illustrates, in a detailed illustration in the form of a sectional illustration, two side parts which are positioned next to each other with a gap covering located in between, with a second embodiment of the covering material.

FIG. 4 illustrates a further embodiment of the gap covering 6. The covering material 14 is provided here in a fold-like formation. The arching of the flexible covering material 14 forms a W shape here in the normally provided gap width. A fastening pin/pin receptacle 17/18 is shown as an advantageous rapid installation connection of the gap covering 6. The pin receptacle 18 is incorporated at the specified positions during the process of producing the cabin monument 3. Details of the pin receptacle 18 and of the fastening pin 17 are explained in the description of FIGS. 9A, 9B and 9C.

The gap covering 6 is shown in one possible embodiment in FIG. 5. The fastening strips 11, 12 can be flat aluminum strips or plastics strips, for example extruded profiles. The fastening strips 11, 12 are preferably formed as a single part. However, strips which can be plugged together are also possible, for example comprising rectilinear parts 11C and curved parts 11A and 11B, which are joined together in accordance with the outer contour and the dimensions of the cabin monument 3. In the embodiment shown, the curved parts 11A and 11B and the rectilinear parts 11C of the fastening strip 11 follow the contour of the cabin monuments, between which the gap covering 6 is intended to be arranged.

FIGS. 6A, 6B and 6C illustrate the gap covering 6 in the first embodiment of the covering material 14 with a U-shaped arching.

It is apparent in FIG. 6A that, in the case of a normally provided gap width N of, for example, 25.4 mm (corresponds to 1 inch), the covering material 14 is arched in a manner directed into the depth of the gap 5 of the cabin monument arrangement. This size is, for example, the standard gap size between two cabin components in an aircraft passenger cabin.

In FIG. 6B, the flexible covering material 14 is completely stretched as a preferably maximum gap width MAX of approximately 42.4 mm. Owing to the possibility of simple adaptation to different gap widths, the covering material 14 can correspondingly be simply exchanged and can also be configured and adapted easily for other gap sizes.

FIG. 6C illustrates the cabin monument arrangement with the two side parts 7 and 8 at a minimum distance. The minimum gap MIN is 5.4 mm here, and, because of the flexible covering material 14, the gap covering 6 here is designed in such a manner that the fastening strips 11 and 12 are arranged directly or very closely next to each other. Not only are tolerances therefore possible during the installation of the cabin monuments, but so too are gap changes during a flight due to the relative movements of the monuments with respect to one another, without the gap covering slipping out of position or the covering no longer being ensured.

Figure 7A:
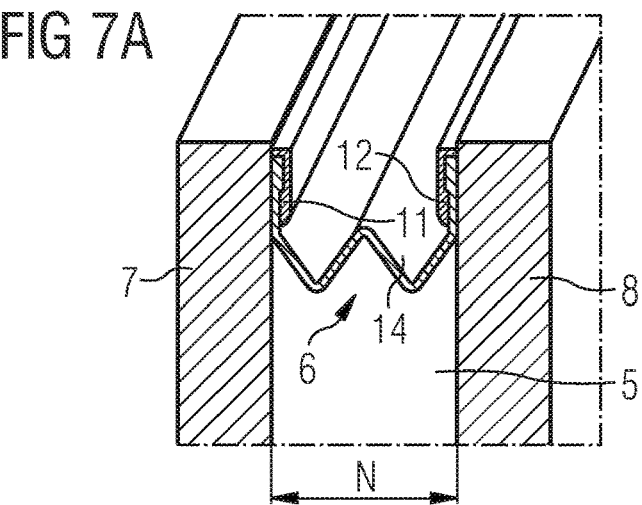
FIGS. 7A, 7B and 7C illustrate, in a detailed view, two side parts having different gap widths with a gap covering according to the disclosure herein located in between, with the second embodiment of the covering material.
Figure 7B:
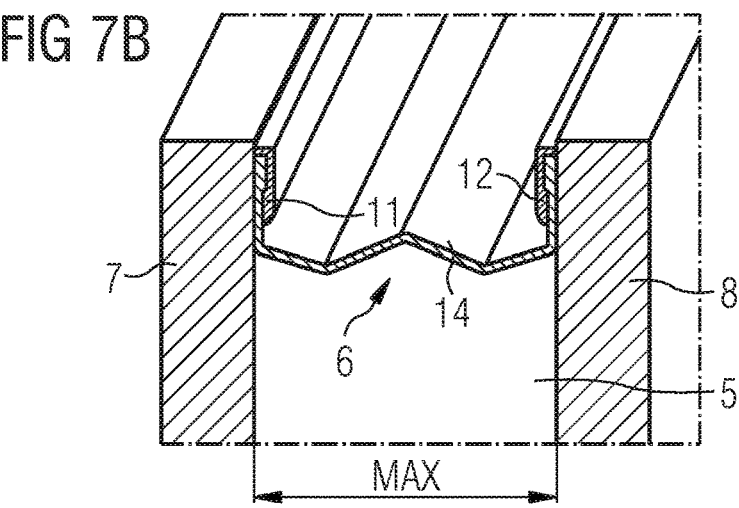
Figure 7C:
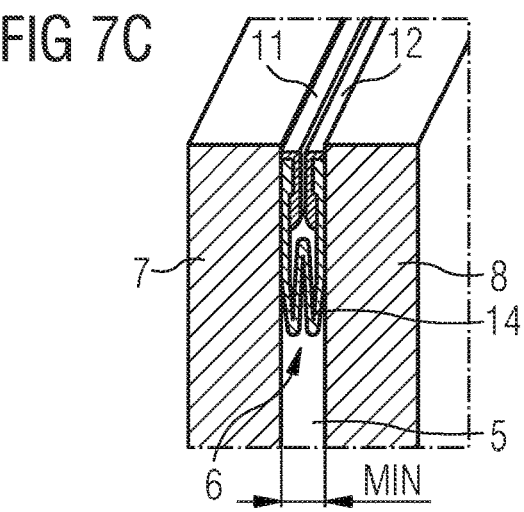

FIGS. 7A, 7B and 7C illustrate the gap covering 6 in the second embodiment of the covering material 14 with a W-shaped arching. This type of shape of the covering material 14 permits a defined shaping or formation of folds, which permits a visually attractive appearance. As already explained with respect to the first embodiment of FIG. 6, the three states of the gap covering 6 with normal, maximum and minimum gap widths are likewise shown here.

FIGS. 8A and 8B each illustrate, in a detailed view in the installation position (FIG. 8A) and final state (FIG. 8B), the fastening of the gap covering 6 according to the disclosure herein by fastening button 16 and fastening button receptacle 15. The fastening button receptacles 15 are incorporated at regular distances in the edge region 9 and 10 of the respective lateral monument parts 7 and 8. This is preferably part of the manufacturing of a cabin monument.

The gap covering 6 can then preferably already be secured on the first side part 7. This takes place by the corresponding press-stud 16 which is provided in the respectively associated position on the fastening strip 11. The second fastening strip 12 with the corresponding fastening button 16 for fastening to the second lateral monument part 8 is preferably provisionally secured on the monument part 7 during the installation of the two monuments 3 and 4 to form a galley. After the positioning and final fastening of the two monuments 3 and 4 to form the final galley arrangement, the fastening strip 12 is installed on the second lateral monument part by the fastening buttons 16. This is possible without further aids and tools, and all necessary components are already in situ for the installation. In the event that the fastening strips 11, 12 and the gap covering 13 is a single component, the fastening to a lateral monument part 7 or 8 suffices.

Figure 9A:
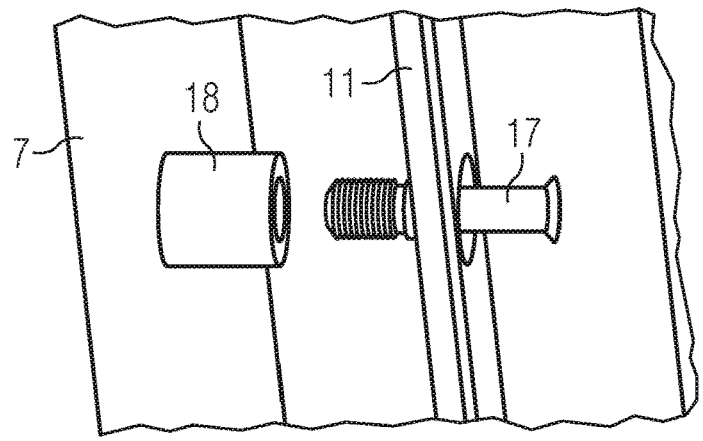
FIGS. 9A, 9B and 9C illustrate, in a detailed view, the fastening of the gap covering according to the disclosure herein by a fastening pin.
Figure 9B:
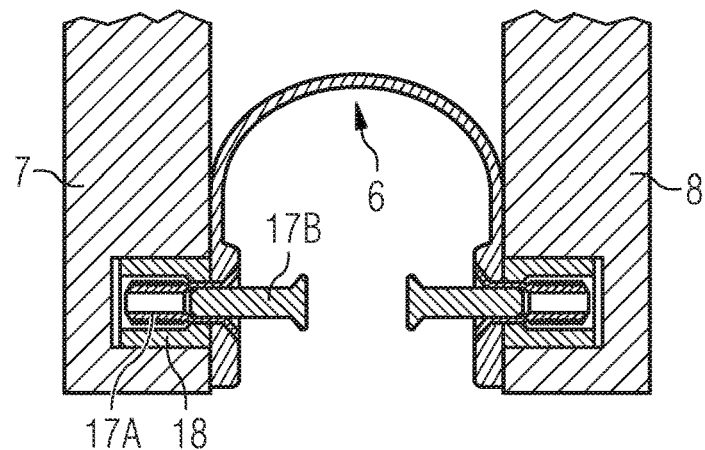
Figure 9C:
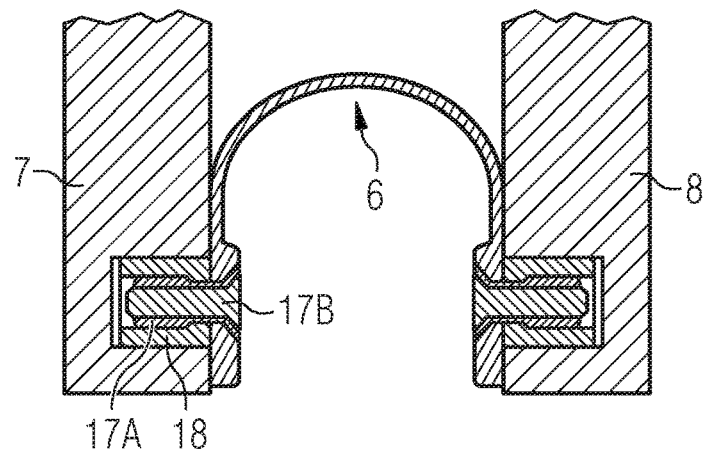

FIGS. 9A, 9B and 9C illustrate the fastening of the gap covering 6 according to the disclosure herein by fastening pin 17 in a further embodiment in a detailed view.

It is apparent in FIG. 9A that the sleeve-like fastening pin receptacle 18 is provided in the lateral monument part 7. This preferably takes place during the normal process of producing the cabin monuments. The two-part fastening pin 17 which is arranged on the fastening strip 11 is furthermore shown. As shown in FIG. 9B, the pin element 17A is pressed in in the fastening pin receptacle 18. The gap covering 6 is therefore secured in the correct position on the lateral monument parts 7 and 8. This securing is secured by the securing element 17B. It is illustrated in FIG. 9C that the securing element 17B is pressed into the pin element 17A and therefore braces and therefore locks the pin element 17A in the receptacle 18. In order to release the connection, for example in order to permit simple exchange of the gap covering 6, the securing element 17B can be pulled out and the pin element 17A can be removed from the fastening pin receptacle 18.

Features or steps which have been described with reference to one of the above exemplary embodiments can also be used in combination with other features or steps of other exemplary embodiments described above. Reference signs in the claims should not be considered to be a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

1 Aircraft passenger cabin
2 On-board toilet (cabin monument)
3 First cabin monument (galley)
3A, 3B, 3C Parts of the galley
4 Second cabin monument (galley)
5 Gap
6 Gap covering
6A, 6B curved regions of the gap covering
7 First lateral monument part
8 Second lateral monument part
9 Front edge portion of 7
10 Front edge portion of 8
11 First fastening strip
11A, 11B Curved regions of 11
11C Rectilinear regions of 11
12 Second fastening strip
13 Covering element
14 Covering material
15 Fastening button receptacle
16 Fastening button
17 Fastening pin
17A Pin element 17A
17B Securing element 17B.
18 Fastening pin receptacle
19 Fastening point

The invention claimed is:

1. A cabin monument arrangement for a passenger cabin of an aircraft, comprising at least two cabin monuments which are arranged next to each other and a first side wall of a first of the at least two cabin monuments which is oriented substantially parallel and opposed to a second side wall of a second of the at least two cabin monuments, wherein a gap is formed between the first side wall and the second side wall and comprises a gap covering comprising:
   a. a respective fastening region disposed along the first side wall and along the second side wall in a region of a front edge portion of the respective cabin monument;
   b. a first contour-adapted rigid fastening strip on a first fastening region and a second contour-adapted rigid fastening strip on a second fastening region;
   c. a covering element arranged between the first and second fastening strips for covering the gap between the first monument part and the second monument part;
   d. wherein the covering element is formed from a flexible covering material of thin design.

2. The cabin monument arrangement according to claim 1, wherein the fastening strip can be arranged on a respective one of the first side wall or the second side wall at least two fastening points.

3. The cabin monument arrangement according to claim 1, wherein the fastening strip has curved regions and rectilinear regions, which are adapted to a contour of the monument.

4. The cabin monument arrangement according to claim 1, wherein the fastening strip is formed as a single part.

5. The cabin monument arrangement according to claim 1, wherein the fastening strip is of multi-part design, and the curved strip portions and rectilinear strip portions can be joined together and are adapted to an outer contour of the respective monument.

6. The cabin monument arrangement according to claim 1, wherein the covering material comprises strips of fabric, textile material, film or rubber.

7. The cabin monument arrangement according to claim 1, wherein the covering material is of U-shaped or foldable design and is connected at two border regions to the fastening strips.

8. The cabin monument arrangement according to claim 1, wherein the fastening strip comprises aluminum, plastic, glass-fiber-reinforced plastics fiber material or carbon-fiber-reinforced plastics fiber material.

9. The cabin monument arrangement according to claim 1, wherein the fastening strip is provided with rapid installation fastening elements at a plurality of fastening points.

10. An aircraft passenger cabin, comprising a cabin monument arrangement according to claim 1.

11. A method for installing a cabin monument arrangement for a passenger cabin of an aircraft, the cabin monument arrangement comprising at least two cabin monuments arranged next to each other and a first side wall of a first of the at least two cabin monuments which is oriented substantially parallel and opposed to a second side wall of a second of the at least two cabin monuments, wherein a gap is formed between the first side wall and the second side wall and comprises a gap covering comprising:
   a respective fastening region disposed along the first side wall and along the second side wall in a region of a front edge portion of the respective cabin monument;
   a first contour-adapted rigid fastening strip on a first fastening region and a second contour-adapted rigid fastening strip on a second fastening region; and
   a covering element arranged between the first and second fastening strips for covering the gap between the first monument part and the second monument part,
   wherein the covering element is formed from a flexible covering material of thin design;
the method comprising steps of:
   a. aligning and securing a first cabin monument;
   b. attaching the gap covering with a first fastening strip in a front edge region of the first cabin element;
   c. aligning and securing a second cabin monument such that the respective side walls are aligned substantially parallel and form a gap;
   d. attaching a second fastening strip in a front edge region of the second cabin monument; and
   e. directing the covering material into a uniform alignment.

12. The method according to claim 11, wherein method steps b and c proceed in a sequence c and b.

* * * * *